March 6, 1945.   A. H. SCHUTTE   2,370,999
LIQUID-SOLID SEPARATION
Filed Nov. 9, 1940
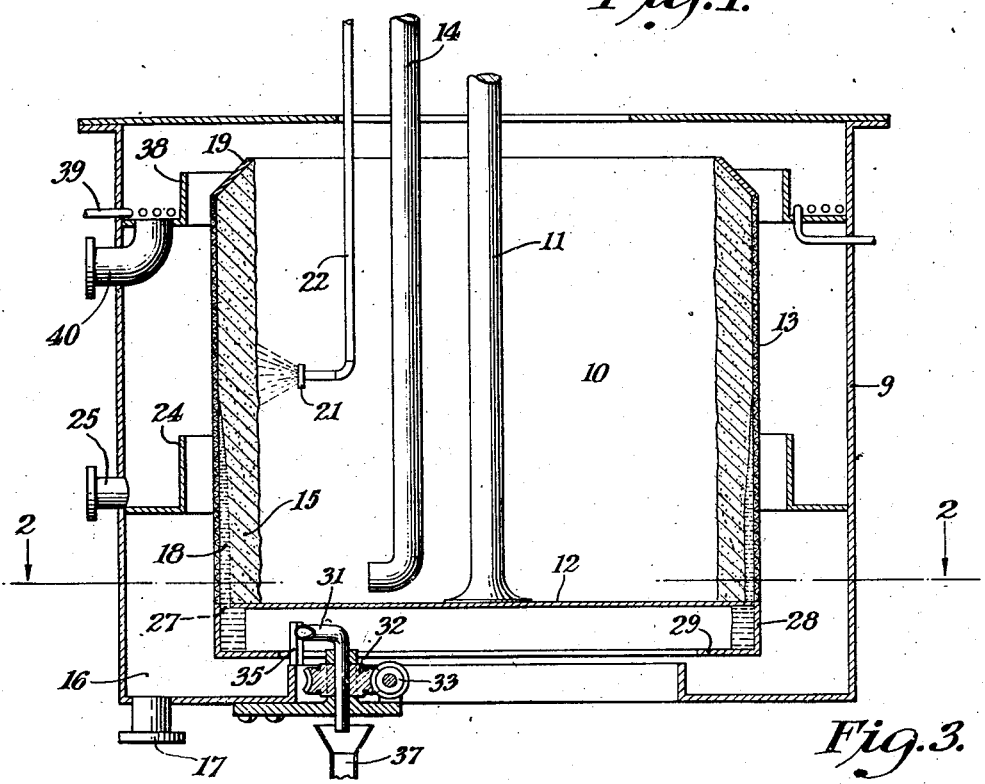
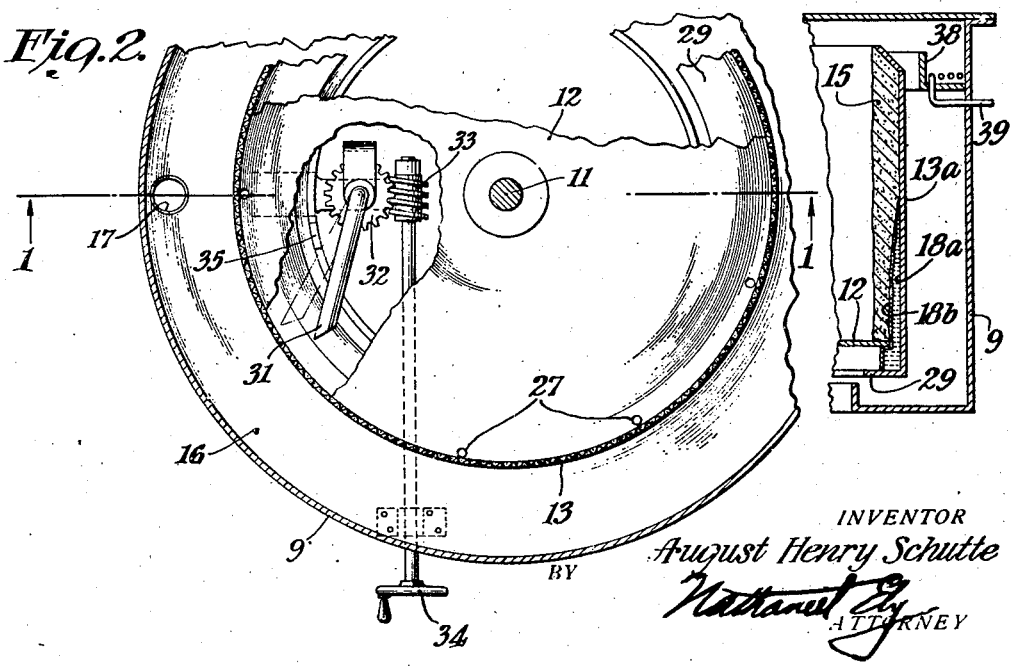
INVENTOR
August Henry Schutte
BY
ATTORNEY Patented Mar. 6, 1945

2,370,999

UNITED STATES PATENT OFFICE 2,370,999

LIQUID-SOLID SEPARATION

August Henry Schutte, Bronxville Manor, N. Y.

Application November 9, 1940, Serial No. 364,992

2 Claims. (Cl. 210—75)

This invention relates to improvements in the method of and apparatus for continuously separating liquids from solids by centrifuging an emulsion of such materials and more particularly relates to the separation of substantially wax-free oil and oil-free wax from oil-wax emulsions as disclosed in my prior patent, No. 2,168,306, issued August 1, 1939.

As pointed out in my patent, No. 2,168,306, above referred to, I have found that materials which are very difficult or impossible to separate, such as oil in an oil-wax mixture, can be effectively separated on a commercial scale by the emulsification of the mixture in the liquid state, preferably with a third material, which should be immiscible with and a non-solvent for each of the other materials. The emulsification of such materials makes it possible to obtain a dispersed phase of one of the constituent materials in the third material, which is usually water. Such emulsion is preferably chilled to restore the dispersed material to its solid state, and the emulsion is then subjected to a centrifugal force for the separation of the solid material. Oil-wax mixtures are particularly adaptable to this treatment; and, in the separation of an emulsion thereof, the relatively dense liquid portion is uniformly removed from the relatively light and porous wax cake which is retained on the centrifuge. The wax cake can be conveniently washed for additional removal of the oil or the removal of an intermediate wax fraction; and the ultimate wax cake will be found to have a relatively high melting point. If the separation of the materials is for the purpose of providing a substantially wax-free oil, the oil can be substantially completely separated from the wax so that a low pour point product is obtained.

The principal feature of the separation of the oil from the wax, which feature is, of course, applicable to the separation of other materials of the same relative density, is that the separation can be carried out continuously and the cake displaced out of the centrifugal because of the reaction of the relatively heavy slurry which overcomes the resistance to movement of the relatively lighter cake. The cake appears to slide on itself with a continued movement along the centrifugal wall, during which time it passes through a necessary drying period, and then discharges out of the top of the machine.

The net displacing force acting upon the cake is a function of the difference between a force exerted longitudinally along the centrifugal wall and a resisting force counter to it. Each of these forces is a function of the square of the revolutions per minute of the centrifugal, of the distance of the focus of the forces from the inner face of the cake, and of the density of the materials. Inasmuch as the density of the slurry is substantially greater, however, than the density of the cake by virtue of the fact that the cake is an expanded porous emulsion from which the dense liquid has been withdrawn, there is a resultant force which will cause a definite movement of the cake. This force can be varied and the cake movement can be controlled by the rate of introduction of the displacing feed slurry to be several inches per minute or slower, depending upon the required time for drying of the cake.

After extensive commercial use of large centrifugals of 48" and 60" diameter with various forms of filter cloth and with different types of oil-wax emulsion feeds, I have found that there is a further factor which determines the drying rate of the cake. This is based upon the time which it takes for the liquid to be removed from the cake zone. When it is considered that the entire time of the operation from feeding a particle of emulsion to the centrifugal to the removal of the solid cake particle from the centrifugal is only a few minutes and that, at the speed of operation, the liquid is discharged through the cake in a fraction of this time, it will be apparent that the delay or the hindrance to passage of the liquid away from the cake zone because of the viscosity of the liquid or other reasons will materially interfere with the remaining cake treating operations.

The principal object of my present invention is to provide an improved method for the centrifugal separation of solids from liquids in an emulsion so that the liquid may be discharged promptly and adequate time for drying, washing, or other subsequent operations on the retained solids will be allowed.

A more specific object of the invention is to provide an improved method for withdrawing a part of the dense liquid constituents of a liquid-solid emulsion by skimming off a clear portion of the liquid constituents and the removal of the remaining liquid by filtration, the manner of removal of the skimmed material being such that it is relatively free of solids at all times and the rate of removal of skimmed material determining the amount of movement of the cake, during which washing and other treatment may be applied thereto.

Another object of the invention is to provide a centrifugal filter having a depending channel with interconnecting openings between the channel and the main body of the filter located at the maximum radius so that, in the filtration of relatively heavy liquids from relatively lighter solids, a portion of the liquid at the extreme radius, which has freed itself of solids, can be withdrawn from the channel and the remainder of the liquid can be removed through the filter medium while the cake is moved across the filter medium and discharged at the opposite end of the filter.

Further objects and advantages of my invention will appear from the following description of an improved form of embodiment thereof taken in conjunction with the attached drawing, of which Fig. 1 is a vertical section taken centrally through the centrifugal and substantially along the line 1—1 of Fig. 2;

Fig. 2 is a horizontal section taken substantially along the line 2—2 of Fig. 1;

Fig. 3 is a partial vertical section of a modified construction.

In accordance with the preferred form of embodiment of my invention, I have shown in the attached figures a diagrammatic representation of a centrifugal filter; the casing 9 of which contains a rotating basket 10 which may be driven by any well-known means as by the shaft 11. Such basket is provided with a substantially imperforate end wall or bottom 12 and foraminous axial walls 13 having a suitable filter medium to accomplish a desired separation between the liquid and solid constituents of an emulsified slurry which is conveniently fed to the closed end of the basket 10 as by the feed pipe 14.

As previously mentioned, one of the unique features of my invention is its applicability to the continuous separation of oil and wax, particularly hydrocarbon oils and paraffin waxes. This separation is accomplished by feeding a chilled emulsion of the oil-wax mixture and water or other non-solvent and immiscible material to the filter. The rapid rotation of the filter basket 10 causes a penetration of the relatively dense liquid including the water and the oil through the filter medium where it is collected in the filtrate chamber 16 and may be removed through the filtrate outlet 17. The cake 15 is formed on the filter walls.

In certain cases I have determined that a liquid body extends partly up the wall of the filter because of the difficulty or slowness of penetration of the liquid through the filter medium. The liquid should penetrate the filter under normal circumstances in a small fraction of a minute; but, because of temperature conditions and the viscosity of the liquid, I have found that the liquid column generally indicated at 18 may extend quite a distance along the filter wall from the end wall 12 of the filter. It will be appreciated that this liquid column is substantially free of cake or solid matter because of the fact that the difference in density will tend to compact the dense liquid against the filter medium and force the lighter cake radially inward; but, because of the fact that the light cake does not contact with the filter medium for some portion of its travel to the discharge cone 19, the cake can not be washed completely; and, if the liquid extends to the top of the filter, liquid and cake, in slugs, discharge over the top.

The effective washing of the cake by the spray 21, which is fed from the pipe 22, is necessary to remove the last traces of the liquid or to remove any of the lower melting point materials in the wax cake. It will be understood that a solvent for the oil or warm water spray can be used as the wash liquid, and the liquefied products are then discharged through the filter medium into the intermediate-cut collector zone 24, from which they are removed through the outlet pipe 25.

In order to avoid any substantial height of liquid behind the filter cake 15, I have now determined that this liquid, being substantially free of solids, can be removed from the filter without interfering with the cake discharge by providing a series of small apertures 27 in the end wall 12, such apertures being placed at the greatest radius of operation and thus just inside of the foraminous wall 13. A large number of apertures or larger apertures are not necessary as the centrifugal effect is substantial. The size will depend to a certain extent on the type of oil.

The channel 28 has substantially the same diameter as the end wall of the filter and is preferably provided with a radially inwardly projecting flange 29, which serves as a gutter or channel for the liquid which discharges through the apertures 27.

As will be apparent from Fig. 1, the depth of liquid in the channel 28 will be based upon its radius of rotation and upon its density and the balancing pressure of the oil in the column 18 on its radius of rotation and on the lighter cake 15 and on its radius of rotation, which cake is impressing a force on the oil 18.

The depth of liquid in the channel 28 will be intermediate between the total depth of the wax cake and the depth of oil in the filter basket. It will definitely determine the length of the column 18 along the axial wall of the filter medium; and, if I independently remove a part of this liquid as by means of a scoop, the length of the liquid column in the filter basket can be reduced with the result that the cake 15 will engage with the filter medium on wall 13 at a much earlier point and therefore be subjected to a more complete treating operation. It will be understood that the length of the liquid column behind the cake is primarily a function of time of filtration and viscosity of filtrate. If the amount of filtrate is reduced, the filtrate will pass through sooner and the cake can contact with the filter medium sooner.

As heretofore mentioned, the oil collected in the channel 28 has moved radially to adjacent the inner wall of the filter in order to pass downwardly through the apertures 27 in wall 12 and thence into the channel. It will also appear that the cake, because of its lighter density, cannot reach the filter wall if the filtrate does not pass through with the result that the oil in the channel 28 is substantially completely free of solids and there can be no detriment to its removal. This construction thus acts as an automatic trap.

A suitable mechanical means for removing this oil from the channel 28 is diagrammatically illustrated in Figs. 1 and 2. It includes a scoop or a nozzle generally indicated at 31 and conveniently mounted on a pipe which is carried by the gear 32, which is in turn operated by the worm 33 and the external wheel 34. A stop 35 is provided to prevent contact of the scoop with the wall of the channel, it being noted that by the simple manipulation of the wheel 34 the scoop can be placed in the path of the liquid in the channel 28 and as much liquid removed as is found desirable. Such liquid is conveniently carried into the discharge conduit 37 as shown in Fig. 1.

The remaining operation of the filter and the removal of the cake are accomplished as described in my copending application, Serial Number 258,527, filed February 25, 1939, now Patent 2,326,971, granted August 3, 1943. The resultant of forces on the cake, because of its lighter density and porous nature as compared to the oil which is removed therefrom, is such that the cake will continuously move along the filter medium on wall 13 and will discharge over the cone 19 with a continued feed of heavy emulsified slurry, and the cake can be collected in the cake collecting zone 38, which may be conveniently heated with a steam coil 39 so that the melted wax can be removed through the conduit 40.

Although I have particularly referred to the separation of oil and wax, it will be apparent that my invention is of general application to the separation of any relatively dense and viscous liquid from a relatively lighter solid where the filter rate of the liquid through the filter medium may delay the residence of the cake on the filter medium. With large machines, i. e., of large diameter, this condition becomes greatly aggravated due to the relatively lower ratio between wall area and volume, and with certain materials the amount of the liquid portion may be so great as to exceed the filter rate. For example, the filtration of seven hundred barrels per day of slack wax containing forty per cent foots oil is within the capacity of a 60" machine while the separation of more than four hundred barrels per day of a lighter oil containing eighty per cent foots oil can not be carried out on the same machine except by the skimming action.

I am also not to be limited by the showing of a vertical machine although for most operations it is mechanically simpler to mount the machine in a vertical position. The centrifugal force operating on the device is so great that the relative force of gravity is comparatively unimportant.

In Fig. 3 I have shown a slightly modified form of machine which has the same housing 9, in which is mounted a centrifugal having a similar substantially imperforate end wall or bottom 12 adapted to be rotated as in the first form of embodiment. The wall 13a of such centrifugal, however, is imperforate and the centrifugal is known as the solid bowl clarifier type. By the introduction of the emulsified slurry, however, a cake 15 will form on the wall and the liquid separated from the cake because of its greater density will form in the column 18a. The cake 15 will discharge in the usual manner over the cone into the cake receiving channel 38 as in the first case, such channel being heated as by the steam coil 39.

The liquid constituents of the feed include not only the oil, which forms a layer 18b, but the water being used as the emulsifying material, which normally has a greater density than both the porous cake 15 and the oil formerly contained therein forming the layer 18b.

As in the prior case, both of these liquids can be removed from the channel 28 as by a skimming device heretofore described. In such case it will be possible to continuously centrifuge and simultaneously remove from opposite ends of the machine the dried cake by the continued feed of emulsion and the liquid by the skimming action. The effective height of the columns 18a and 18b of liquid will be definitely established by the depth of liquid in the channel 28 and, if the liquid is removed from the channel 28 in substantial purity and at such a rate that the liquid does not extend more than part way up the path of cake discharge, the ultimate cake will be substantially dried as in the first form described.

While I have shown a preferred form of embodiment of my invention, I am aware that modifications may be made thereto, and I, therefore, desire a broad interpretation of my invention within the scope and spirit of the disclosure herein and of the claims appended hereinafter.

I claim:

1. In the method of filtering an emulsion of a relatively heavy liquid and a relatively light solid by introducing the emulsion into a centrifugal filter and rotating the filter to force liquid through the filter medium and to form a relatively light porous cake within the filter, and wherein liquid accumulates between the filter cake and the filter medium, the steps comprising continuously withdrawing the liquid so accumulated, independently of the filter medium, and passing said liquid to a point axially spaced from the zone of separation within the rotor, constraining the so-withdrawn liquid to rotate with the rotor and to form, around the rotor axis, an annular body of the liquid extending radially depthwise inwardly from said point, to oppose, by the hydrostatic head created by the action of centrifugal force upon said body, said withdrawal of liquid from between the filter medium and the separated solid, continuously withdrawing liquid from said annular body, and controlling the amount of liquid accumulated between the filter medium and the separated solid by controlling the rate of said liquid withdrawal from the annular body to adjust the radial depth of said body and thereby determine the hydrostatic head opposing said withdrawal of said accumulated liquid.

2. A centrifugal separator comprising a rotatable filter drum having a circumferential filter medium, to receive a mixture of a relatively heavy liquid and a relatively light solid for separation thereof, said drum having a wall closing one end thereof, the opposite end of the drum being open for introduction of the mixture and for axial discharge of the solid separated from the mixture, a feed conduit for the mixture extending into the drum through the open end thereof and arranged to discharge the mixture into the closed-end portion of the drum, means borne by the drum to rotate therewith and forming at the outer side of said end wall an annular channel concentric with the axis of rotation of the drum and open radially around the inner circumference thereof toward said axis, a flow communication leading from the interior of the drum immediately inwardly of the filter medium and opening into said channel at a point adjacent the outer circumference of the channel to conduct to the channel liquid accumulating at the inner surface of the filter medium, said channel extending radially depthwise materially inwardly from said point to form of the received liquid an annular body subject to the action of centrifugal force to create a hydrostatic head for opposing flow of liquid from the drum to the channel, a scoop mounted independently of the drum and projecting into the open side of the channel to skim liquid from the inner circumferential surface of the body of liquid during rotation of the drum, and means to adjust said scoop radially depthwise of the channel and thereby adjust the rate of withdrawal of liquid from the channel to determine said hydrostatic head for control of said accumulation of liquid in the drum.

AUGUST HENRY SCHUTTE.

CERTIFICATE OF CORRECTION.

Patent No. 2,370,999.                                    March 6, 1945.

AUGUST HENRY SCHUTTE.

It is hereby certified that error appears in the printed specification of the above numbered patent requiring correction as follows: Page 3, first column, line 5, for "Patent 2,326,971" read --Patent 2,326,071--; and that the said Letters Patent should be read with this correction therein that the same may conform to the record of the case in the Patent Office.

Signed and sealed this 12th day of June, A. D. 1945.

Leslie Frazer (Seal)                                          Acting Commissioner of Patents.